United States Patent
Linkola

(10) Patent No.: US 11,902,820 B1
(45) Date of Patent: *Feb. 13, 2024

(54) ADAPTIVE PHYSICAL LAYER INTERFACE CONTROL FOR A WIRELESS LOCAL AREA NETWORK

(71) Applicant: CSC Holdings, LLC, Bethpage, NY (US)

(72) Inventor: Janne Linkola, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,046

(22) Filed: Feb. 16, 2023

Related U.S. Application Data

(63) Continuation of application No. 17/326,181, filed on May 20, 2021, now Pat. No. 11,601,839, which is a continuation of application No. 16/456,022, filed on Jun. 28, 2019, now Pat. No. 11,019,521, which is a continuation of application No. 15/959,918, filed on Apr. 23, 2018, now Pat. No. 10,341,897, which is a continuation of application No. 14/928,204, filed on Oct. 30, 2015, now Pat. No. 9,986,455.

(51) Int. Cl.
*H04W 28/02* (2009.01)
*H04L 69/323* (2022.01)
*H04W 24/08* (2009.01)

(52) U.S. Cl.
CPC ....... *H04W 28/0205* (2013.01); *H04L 69/323* (2013.01); *H04W 24/08* (2013.01); *H04W 28/0226* (2013.01); *H04W 28/0278* (2013.01); *H04W 28/0289* (2013.01); *H04W 28/02* (2013.01); *H04W 28/0247* (2013.01)

(58) Field of Classification Search
CPC ............. H04W 28/0205; H04W 24/08; H04W 28/0226; H04W 28/0278; H04W 28/0289; H04W 28/02; H04W 28/0247; H04L 69/323
See application file for complete search history.

(56) References Cited

U.S. PATENT DOCUMENTS

| | | | | |
|---|---|---|---|---|
| 6,788,937 B1 * | 9/2004 | Willenegger | ....... | H04W 74/002 370/335 |
| 7,085,228 B2 * | 8/2006 | Zaki | ...................... | H04L 1/0002 370/230.1 |

(Continued)

*Primary Examiner* — Wutchung Chu
(74) *Attorney, Agent, or Firm* — Sterne, Kessler, Goldstein & Fox P.L.L.C.

(57) ABSTRACT

A wireless access point (WAP) supports one or more physical layer (PHY) operational parameters which can be restricted from use to lessen congestion within a wireless network (WN). The WAP periodically transmits a management frame to enable one or more communication devices to establish and/or maintain communication with the WAP. The wireless network can restrict one or more of the one or more PHY operational parameters, such as PHY data rates to provide an example, that are supported by the WAP from being utilized for communicating the management frame. This restriction of the one or more PHY operational parameters allows the WAP to periodically transmit the management frame at an increased PHY data rate thereby decreasing time needed for communicating the management frame which can lessen the congestion within the WN.

20 Claims, 4 Drawing Sheets

(56) References Cited

U.S. PATENT DOCUMENTS

Figure 1A:
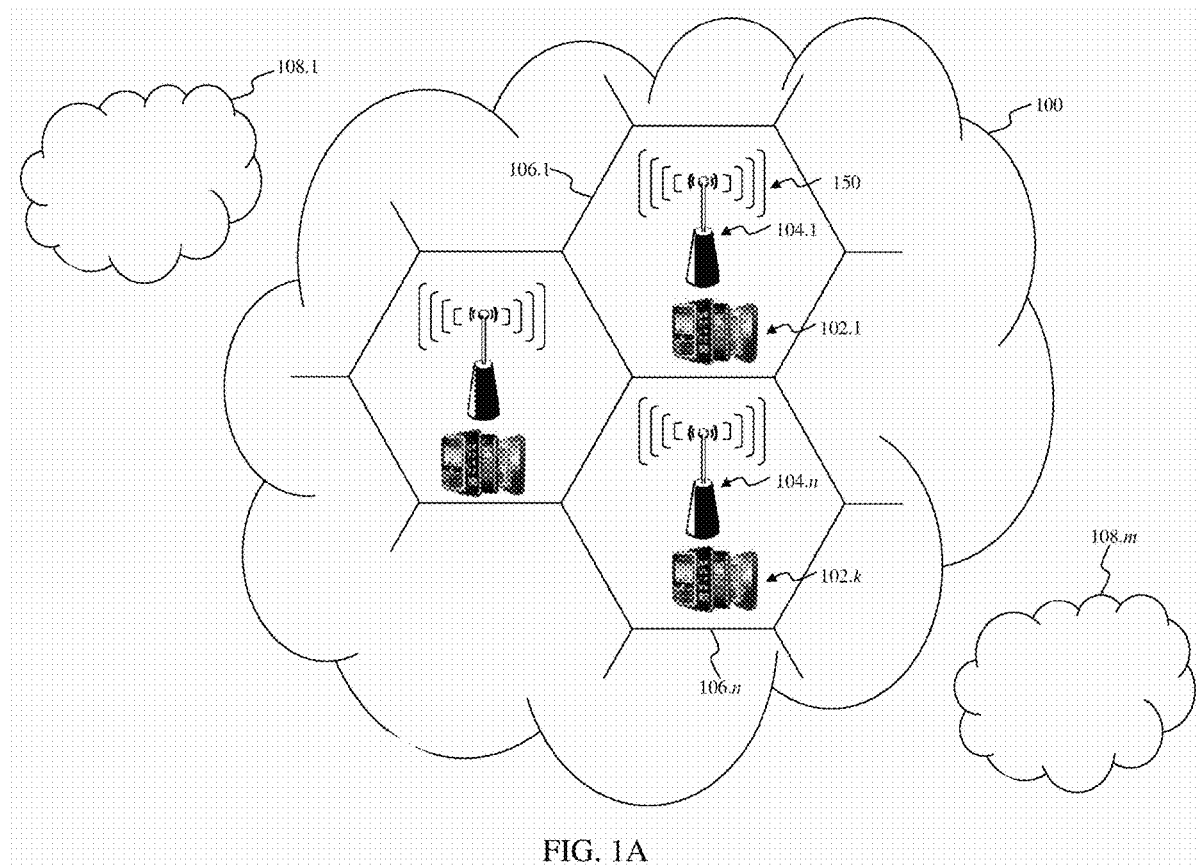

| | | | | |
|---|---|---|---|---|
| 8,238,287 B1* | 8/2012 | Gopi | ........................ | H04L 43/16 370/401 |
| 8,780,819 B2* | 7/2014 | Nam | .................... | H04W 72/541 370/332 |
| 8,904,027 B2* | 12/2014 | Knittle | ............... | H04N 21/2402 725/96 |
| 9,497,740 B2* | 11/2016 | Gupta | ................. | H04W 40/005 |
| 9,986,455 B1 | 5/2018 | Linkola | | |
| 10,341,897 B1 | 7/2019 | Linkola | | |
| 11,019,521 B1 | 5/2021 | Linkola | | |
| 2003/0033425 A1* | 2/2003 | Deshpande | ........... | H04L 47/263 709/233 |
| 2005/0152320 A1* | 7/2005 | Marinier | ............... | H04W 16/06 370/349 |
| 2005/0190732 A1* | 9/2005 | Douglas | .............. | H04L 41/0896 370/338 |
| 2005/0213502 A1* | 9/2005 | Convertino | ........... | H04L 1/0014 370/468 |
| 2006/0007914 A1* | 1/2006 | Chandra | ............... | H04W 28/10 370/352 |
| 2006/0045117 A1* | 3/2006 | Qi | ......................... | H04W 24/02 370/252 |
| 2006/0165166 A1* | 7/2006 | Chou | ................. | H04N 21/2402 375/E7.017 |
| 2006/0182065 A1* | 8/2006 | Petrovic | ............... | H04W 28/02 370/332 |
| 2007/0081462 A1* | 4/2007 | Gefflaut | ............ | H04W 28/0808 370/235 |
| 2008/0181184 A1* | 7/2008 | Kezys | ................. | H04W 52/343 370/338 |
| 2010/0169723 A1* | 7/2010 | Baldo | ................... | H04W 84/12 714/704 |
| 2011/0170408 A1* | 7/2011 | Furbeck | ............ | H04W 28/0289 370/230 |
| 2011/0299448 A1* | 12/2011 | Meier | ..................... | H04L 12/18 370/312 |
| 2011/0302236 A1* | 12/2011 | Shrum, Jr. | .......... | H04N 21/6582 709/203 |
| 2012/0209978 A1* | 8/2012 | Cho | ....................... | H04W 60/04 709/223 |
| 2012/0294150 A1* | 11/2012 | Camps Mur | .......... | H04L 47/365 370/235 |
| 2013/0201834 A1* | 8/2013 | Klingenbrunn | ........ | H04W 8/24 370/236 |
| 2013/0294246 A1* | 11/2013 | Geijer Lundin | ...... | H04W 28/10 370/235 |
| 2013/0308446 A1* | 11/2013 | Muto | .................... | H04W 76/36 370/230 |
| 2015/0089079 A1* | 3/2015 | Knittle | ............... | H04N 21/2662 709/233 |
| 2015/0124604 A1* | 5/2015 | Dao | ........................ | H04L 47/12 370/231 |
| 2016/0255010 A1* | 9/2016 | Shukla | .................... | H04L 47/12 370/235 |
| 2016/0262163 A1* | 9/2016 | Gonzalez Garrido | ...................... | H04W 72/541 |
| 2016/0353320 A1* | 12/2016 | Hongo | ................ | H04W 40/244 |
| 2017/0013493 A1* | 1/2017 | HomChaudhuri | .......................... | H04W 36/0085 |

* cited by examiner

ADAPTIVE PHYSICAL LAYER INTERFACE CONTROL FOR A WIRELESS LOCAL AREA NETWORK

CROSS-REFERENCE TO RELATED APPLICATIONS

The present application is a continuation of U.S. patent application Ser. No. 17/326,181, filed May 20, 2021, now U.S. Pat. No. 11,601,839, which is a continuation of U.S. patent application Ser. No. 16/456,022, filed Jun. 28, 2019, now U.S. Pat. No. 11,019,521, which is a continuation of U.S. patent application Ser. No. 15/959,918, filed Apr. 23, 2018, now U.S. Pat. No. 10,341,897, which is a continuation of U.S. patent application Ser. No. 14/928,204, filed Oct. 30, 2015, now U.S. Pat. No. 9,986,455, each of which is incorporated herein by reference in its entirety.

BACKGROUND

Field of Disclosure

The present disclosure generally relates to a wireless network (WN) and including adaptive physical layer interface (PHY) control of one or more adaptive wireless access points (WAPs) within the WN.

Related Art

The continued evolution of communication devices, such as mobile communication devices or personal computing devices, has allowed these devices to communicate vast amounts of information. Traditionally, these communication devices were directly connected to each other using communication cables to support wired communication. This traditional wired communication is now being replaced by wireless communication through a wireless network. The wireless network represents a wireless communication network distributed over various geographical coverage areas, each geographical coverage area being served by one or more access point (APs). The wireless network allows the communication devices to communicate vast amounts of information without being bound to the communication cables allowing the communication devices to freely move about the wireless network.

BRIEF DESCRIPTION OF THE DRAWINGS/FIGURES

Figure 1B:
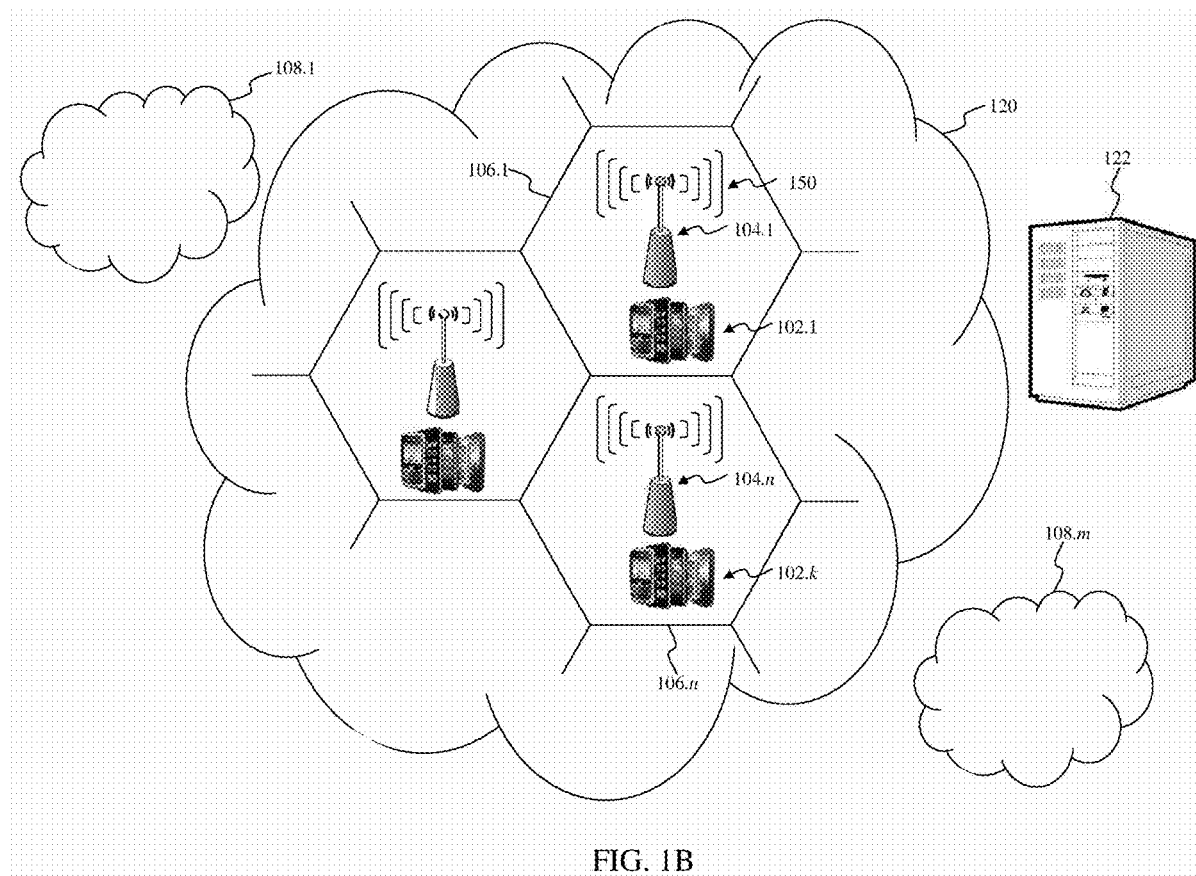
Figure 2:
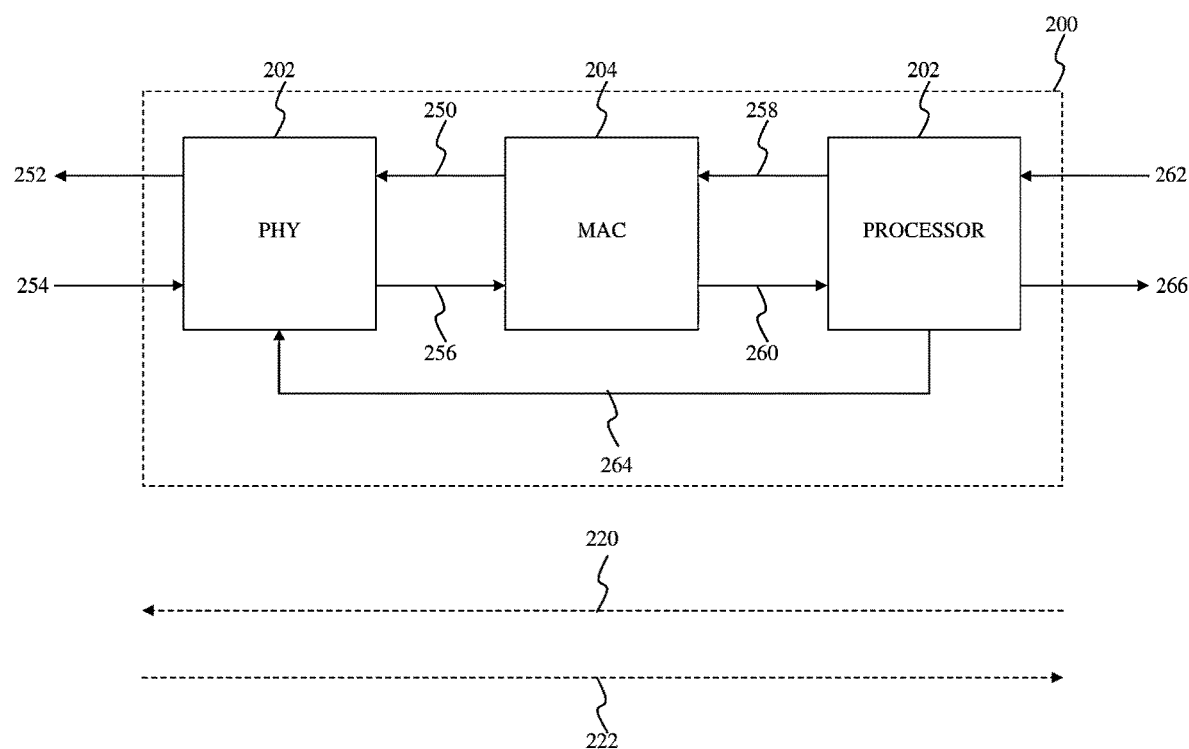
Figure 3:
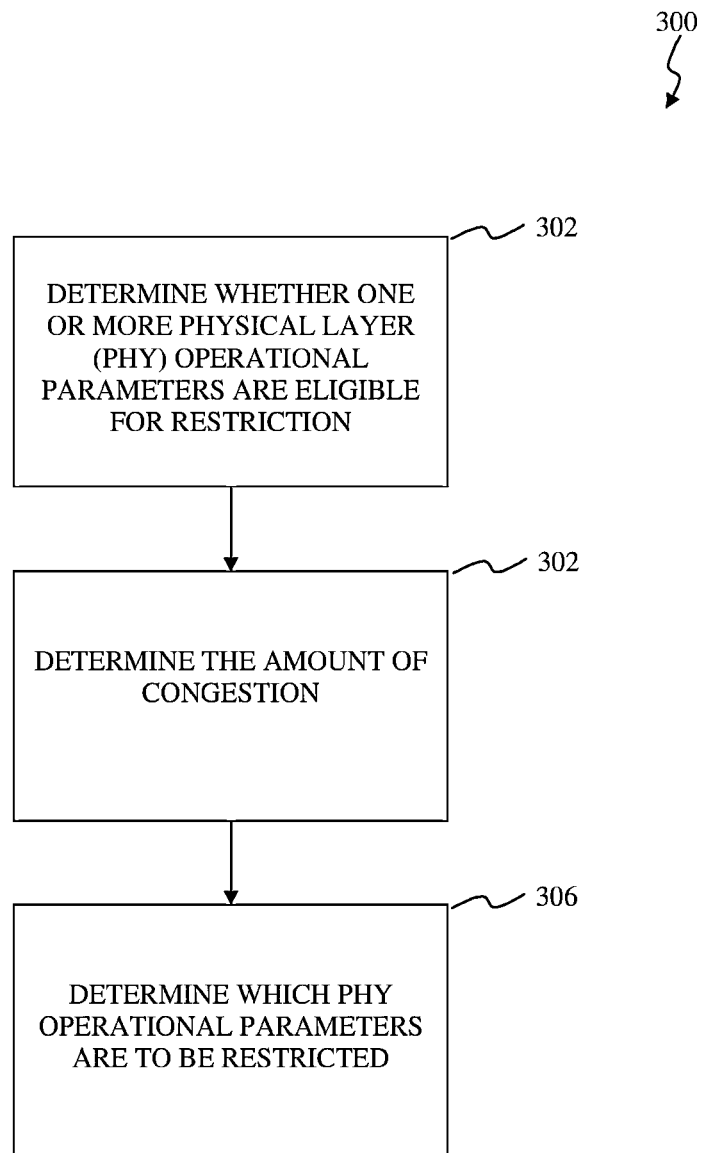

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1A graphically illustrates a first adaptive wireless network according to an exemplary embodiment of the present disclosure;

FIG. 1B graphically illustrates a second adaptive wireless network according to an exemplary embodiment of the present disclosure;

FIG. 2 graphically illustrates block diagram of a wireless access point (WAP) that can be implemented within the wireless network (WN) according to an exemplary embodiment of the present disclosure; and FIG. 3 is a flowchart of exemplary operational steps of the processor for determining a restriction of one or more physical layer (PHY) operational parameters that are supported by a PHY according to an exemplary embodiment of the present disclosure.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

Overview

A wireless access point (WAP) supports one or more physical layer (PHY) operational parameters which can be restricted from use to lessen congestion within a wireless network (WN). The WAP periodically transmits a management frame to enable one or more communication devices to establish and/or maintain communication with the WAP. The wireless network can restrict one or more of the one or more PHY operational parameters, such as PHY data rates to provide an example, that are supported by the WAP from being utilized for communicating the management frame. This restriction of the one or more PHY operational parameters allows the WAP to periodically transmit the management frame at an increased PHY data rate thereby decreasing time needed for communicating the management frame which can lessen the congestion within the WN.

A First Exemplary Adaptive Wireless Network

FIG. 1A graphically illustrates a first adaptive wireless network according to an exemplary embodiment of the present disclosure. A wireless network (WN) 100 provides wireless communication between one or more communication devices 102.1 through 102.k and adaptive wireless access points (WAPs) 104.1 through 104.n within geographical coverage areas 106.1 through 106.n. Additionally as illustrated in FIG. 1A, the WN 100 can be proximate to one or more other WNs 108.1 through 108.m. The one or more other WNs 108.1 through 108.m similarly include one or more WAPs communicatively coupled to one or more communication devices such that signals traversing within one or more coverage areas of the other WNs 108.1 through 108.m can propagate through one or more of the geographical coverage areas 106.1 through 106.n. In an exemplary embodiment, the one or more coverage areas of the other WNs 108.1 through 108.m can overlap with one or more of the geographical coverage areas 106.1 through 106.n.

The one or more communication devices 102.1 through 102.k can represent one or more mobile telephony devices, such as one or more mobile phones, one or more mobile computing devices, one or more mobile internet devices, such as one or more tablet computers and/or one or more laptop computers, one or more personal digital assistants, one or more handheld game consoles, one or more portable media players, one or more digital cameras, one or more pagers, one or more personal navigation devices, and/or any other suitable communication device that is capable of wireless communication within the WN 100. The geographical coverage areas 106.1 through 106.n can represent relatively small areas, such as within a person's reach, to form a one or more wireless personal area networks (WPANs), short distances within structures, such as homes, schools, computer laboratory, or office buildings, to form one or more wireless local area networks (WLANs), one or more large areas, such as between neighboring towns and cities or a city and suburb, to form one or more wireless wide area network (WWANs), and/or any combination of WPANs, WLANs, and/or WWANs that will be apparent to those skilled in the relevant art(s) without departing from the spirit and scope of the present disclosure. Although not illustrated in FIG. 1A, one or more of the geographical coverage areas 106.1 through 106.n may overlap with each other.

The WAPs 104.1 through 104.n operate in a substantially similar manner to each other; therefore; only the WAP 104.1 is described in further detail. The WAP 104.1 communicates with the one or more communication devices 102.1 within the geographical coverage area 106.1 and, in some situations, with the one or more communication devices 102.2 through 102.k within the geographical coverage areas 106.2 through 106.n in accordance with one or more communication standards or protocols. The one or more communication standards or protocols can include various wireless networking communication standards or protocols, such as a version of an Institute of Electrical and Electronics Engineers (IEEE) 802.11 communication standard, for example, 802.11a, 802.11b/g/n, and/or 802.11ac which are collectively referred to as Wi-Fi, an IEEE 802.16 communication standard, also referred to as WiMax, a version of a Bluetooth communication standard, a version of a ZigBee communication standard, a version of a Z-Wave communication standard, a version of a IPv6 over Low power Wireless Personal Area Networks (6LoWPAN) communication standard, a version of Insteon, an ISO/IEC 14543-3-10 communication standard, also referred to as EnOcean, and/or or any other wireless communication standard or protocol that will be apparent to those skilled in the relevant art(s) without departing from the spirit and scope of the present disclosure. The one or more communication standards or protocols describe one or more communication signals that are communicated within the WN 100 and/or between the WN 100 and a wired network and/or another wireless network. These communication signals can include a management signal 150 for establishing wireless communication with the WAP 104.1. The management signal 150 can represent an authentication frame, an association request frame, an association response frame, a beacon frame, a deauthentication frame, a disassociation frame, a probe request frame, a probe response frame, a reassociation request frame, and/or reassociation response frame to provide some examples that is periodically transmitted by the WAP 104.1 throughout the WN 100. In some situations, when there is a sufficiently large number of APs 104.1 through 104.n within the WN 100, each of these APs 104.1 through 104.n periodically transmit their corresponding management frames, such as one or more of management frames 150, which can congest the WN 100.

The WAP 104.1 determines whether one or more physical layer (PHY) operational parameters, such as one or more PHY data rates to provide an example, from among multiple PHY operational parameters that are supported by the WAP 104.1 are eligible to be restricted from being utilized for communicating the management signal 150 which can be advantageous in lessening the amount of congestion the WN 100 is experiencing. As part of this determining, the WAP 104.1 collects information related to wireless networking traffic, such as one or more received signal strength indictors (RSSIs) of wireless networking traffic being received by the WAP 104.1 from the one or more communication devices 102.1. and/or the one or more WAPs and/or the one or more communication devices of one or more of the one or more other WNs 108.1 through 108.m, one or more Angles of Arrival (AoAs) of the wireless networking traffic being received by the one or more communication devices 102.1 and/or the one or more WAPs and/or the one or more communication devices of one or more of the one or more other WNs 108.1 through 108.m, one or more Times of Flight (TOFs) of the wireless networking traffic being received by the one or more communication devices 102.1, and/or the one or more WAPs and/or the one or more communication devices of one or more of the one or more other WNs 108.1 through 108.m, and/or any other suitable information that will be apparent to those skilled in the relevant art(s) without departing from the spirit and scope of the present disclosure. The wireless networking traffic, such as wireless data and/or one or more commands, is communicated within the WN 100, within one or more of the other WNs 108.1 through 108.m, and/or among the WN 100 and the one or more of the other WNs 108.1 through 108.m. In an exemplary embodiment, the wireless data can include multimedia data, such as text, images, graphic objects, animation sequences, audio and/or video to provide some examples.

Thereafter, the WAP 104.1 can use the collected wireless networking traffic information to determine one or more locations of the one or more communication devices 102.1. The WAP 104.1 can collect the wireless networking traffic information at multiple instances in time, such as one or more times per hour or one or more times per day to provide some examples. Next, the WAP 104.1 determines one or more locations of the one or more communication devices 102.1 corresponding to one or more of the multiple instances in time to determine an effective coverage area of the WAP 104.1. Typically, the effective coverage area represents a geographical area less than or equal to the geographical coverage area 106.1. Thereafter, the WAP 104.1 compares the effective coverage area, such as an area of the effective coverage area to provide an example, with a coverage area threshold to determine whether the one or more PHY operational parameters can be restricted. For example, if the effective coverage area is less than the coverage area threshold, then WAP 104.1 can be characterized as servicing a small coverage area. In this example, when the WAP 104.1 is servicing this small coverage area, the multiple PHY operational parameters that are supported by the WAP 104.1 are eligible to be restricted from being utilized for communicating the management signal 150. As another example, if the effective coverage area is greater than or equal to the coverage area threshold, then the WAP 104.1 can be characterized as servicing a large coverage area. In this other example, when the WAP 104.1 is servicing this large coverage area, the multiple PHY operational parameters that are supported by the WAP 104.1 are not eligible to be restricted from being utilized for communicating the management signal 150.

Once the WAP 104.1 determines the one or more PHY operational parameters are eligible for restriction, the WAP 104.1 determines the amount of congestion the WN 100 is experiencing to determine whether to restrict the one or more PHY operational parameters from being utilized for communicating the management signal 150. In an exemplary embodiment, the WAP 104.1 can forgo determining whether the one or more PHY operational parameters are eligible for restriction and can simply determine whether to restrict the one or more PHY operational parameters from being utilized for communicating the management signal 150 based upon the amount of congestion. Typically, the wireless networking traffic within the WN 100 and the wireless networking traffic within the one or more other WNs 108.1 through 108.m occupy similar portions of the electromagnetic spectrum. As a result, the wireless networking traffic within the one or more other WNs 108.1 through 108.m as well as the wireless networking traffic within the WN 100 can cause the WN 100 to experience congestion.

The WAP 104.1 determines the amount of congestion through monitoring the wireless networking traffic and/or its carrier sense function. In an exemplary embodiment, the WAP 104.1 determines the amount of congestion in terms of airtime capacity utilization or airtime channel utilization. In this exemplary embodiment, the WAP 104.1 measures the airtime capacity utilization of the similar portions of the electromagnetic spectrum shared by the WN 100 and the one or more other WNs 108.1 through 108.m at different instances in time, for example, at five (5) minute intervals. In this exemplary embodiment, the WAP 104.1 averages multiple measurements of the airtime capacity utilization and compares this average to a congestion threshold to determine whether the WAP 104.1 is experiencing congestion and, therefore, the one or more PHY operational parameters need to be restricted. The congestion threshold, in this exemplary embodiment, can assume different values dependent upon a time of day, e.g., morning, evening, or night.

After determining to restrict the one or more PHY operational parameters from being utilized for communicating the management signal 150, the WAP 104.1 determines which PHY operational parameters from among the one or more PHY operational parameters are to be restricted from being utilized for communicating the management signal 150 which can be advantageous in lessening congestion. The restriction imposed by the WAP 104.1 represents an adaptive restriction that can be adapted by the WAP 104.1 in response to the amount of congestion. The WAP 104.1 can lessen the restriction allowing more PHY operational parameters from among the multiple PHY operational parameters to be utilized by the WAP 104.1 to communicate the management signal 150 as the amount of congestion decreases and/or greaten the restriction allowing fewer PHY operational parameters from among the multiple PHY operational parameters to be utilized by the WAP 104.1 to communicate the management signal 150 as the amount of congestion increases.

For example, the WAP 104.1 communicates the management signal 150 at one of its supported PHY data rates $R_1$ through $R_c$. In this example, the WN 100 can restrict the WAP 104.1 from utilizing a first group of the one or more PHY operational parameters, such as the PHY data rate $R_1$, and allow the WAP 104.1 to utilize a second group of the one or more PHY operational parameters, such as the PHY data rates $R_2$ through $R_c$, to communicate the management signal 150 when the WN 100 is experiencing a first level of congestion. In this example, the WAP 104.1 can greaten the restriction by adaptively restructuring the first group of the one or more PHY operational parameters to include one or more PHY operational parameters from among the second group of the one or more PHY operational parameters, such as the PHY data rate $R_2$, when the WN 100 is experiencing a second level of congestion that is greater than the first level of congestion. This adaptive restructuring further restricts the WAP 104.1 from utilizing the PHY data rate $R_2$ to communicate the management signal 150. Also in this example, the WAP 104.1 can lessen the restriction by adaptively restructuring the second group of the one or more PHY operational parameters to include one or more PHY operational parameters from the first group of the one or more PHY operational parameters, such as the PHY data rate $R_1$, when the WN 100 is experiencing a third level of congestion that is less than the first level of congestion. This adaptive restructuring allows the WAP 104.1 to utilize the PHY data rate $R_1$ to communicate the management signal 150.

A Second Exemplary Adaptive Wireless Network

FIG. 1B graphically illustrates a second adaptive wireless network according to an exemplary embodiment of the present disclosure. A wireless network (WN) 120 provides wireless communication between the one or more communication devices 102.1 through 102.k and the adaptive wireless access points (WAPs) 104.1 through 104.n within the geographical coverage areas 106.1 through 106.n in a substantially similar manner as the WN 100; therefore, only differences between the WN 100 and the WN 120 are to be discussed in further detail. As illustrated in FIG. 1B, the WN 120 is communicatively coupled to a network server 122. The network server 122 can be situated within one or more of the geographical coverage areas 106.1 through 106.n or outside of the geographical coverage areas 106.1 through 106.n and can communicate with the WAPs 104.1 through 104.n using any suitable wired communication and/or wireless communication that will be apparent to those skilled in the relevant art(s) without departing from the spirit and scope of the present disclosure. The network server 122 can represent multiple servers distributed within a single geographic location, such as a premises of a service provider, or can the multiple servers can be distributed among multiple geographic locations.

The network server 122 represents a pool of configurable computing resources that are shared by the WAPs 104.1 through 104.n. As discussed above in FIG. 1A, the WAP 104.1 determines whether the one or more PHY operational parameters are eligible to be restricted, determines the amount of congestion, and/or determines which PHY operational parameters from among the one or more PHY operational parameters are to be restricted. However, one or more of these operations, or portions thereof, can be performed by the network server 122 in a similar manner as discussed above in FIG. 1A. In an exemplary embodiment, the network server 122 can determine whether the one or more PHY operational parameters are eligible to be restricted, can determine the amount of congestion, and/or can determine which PHY operational parameters from among the one or more PHY operational parameters for the WAPs 104.1 through 104.n are to be restricted. For example, as discussed above, the WAPs 104.1 determines the one or more locations of the one or more communication devices 102.1. Thereafter, in this example, the WAPs 104.1 can send the one or more determined locations of the one or more communication devices 102.1 to the network server 122 which determines the effective coverage area and/or whether the one or more PHY operational parameters can be restricted. As another example, the WAP 104.1 determines the amount of congestion through monitoring the wireless networking traffic. In this other example, the network server 122 determines whether to restrict the one or more PHY operational parameters based upon on the amount of congestion, and if so, which PHY operational parameters from among the one or more PHY operational parameters are to be restricted.

Exemplary Wireless Access Point (WAP) that can be Implemented within the Wireless Network (WN)

FIG. 2 graphically illustrates block diagram of a wireless access point (WAP) that can be implemented within the wireless network (WN) according to an exemplary embodiment of the present disclosure. A wireless access point (WAP) 200 communicates the wireless networking traffic and/or management signal, such as the management signal to provide an example, to one or more communication devices of a wireless network (WN), such as the one or more communication devices 102.1 through 102.*k* of the WN 100 and/or of the WN 120 to provide some examples, in a downlink direction 220 and/or receives the wireless networking traffic from the one or more communication devices in an uplink direction 222. The WAP 200 includes a processor 202, a media access controller (MAC) 204, and a physical layer device (PHY) 206. The WAP 200 can represent an exemplary embodiment of one or more of the WAP 104.1 through 104.*n*.

The PHY 202 represents an interface between the WAP 200 and the one or more communication devices and/or other WAPs within the WN. The PHY 202 defines electrical and physical specifications for the WAP 200, such a relationship between the WAP 200 and a transmission medium to provide an example. The PHY 202 establishes and/or terminates one or more connections to the transmission medium to transmit network traffic, such as the wireless networking traffic and/or the management signal to provide some examples, to the one or more communication devices in the downlink direction 220. In an exemplary embodiment, PHY 202 can additionally transmit wireless networking traffic related information to a network server, such as the network server 122 to provide an example, in the downlink direction 220. The wireless networking traffic related information is used by the network server to determine whether the one or more PHY operational parameters are eligible to be restricted, to determine the amount of congestion, and/or to determine which PHY operational parameters from among the one or more PHY operational parameters for the WAP are to be restricted. The PHY 202 establishes and/or terminates one or more connections to the transmission medium to receive the wireless networking traffic and/or the information related to the wireless networking traffic, such as one or more received signal strength indictors (RSSIs) of wireless networking traffic being received by the one or more communication devices, one or more Angles of Arrival (AoAs) of the wireless networking traffic being received by the one or more communication devices, one or more Times of Flight (TOFs) of the wireless networking traffic being received by the one or more communication devices, and/or any other suitable information that will be apparent to those skilled in the relevant art(s) without departing from the spirit and scope of the present disclosure.

Generally, the PHY 202 modulates, encodes, and/or converts an information frame 250, including the wireless networking traffic and/or the management signal, to provide an information signal 252 for transmission to the WN and/or to the network server over the transmission medium in the downlink direction 220. Specifically, the PHY 202 supports one or more physical layer (PHY) operational parameters, such as one or more PHY data rates to provide an example. In some situations, one or more of the one or more PHY operational parameters that are supported by the PHY 202 can be restricted, as discussed in FIG. 1A and FIG. 1B, from being used based upon the amount of congestion the WN is experiencing. The PHY 202 selects one or more of the PHY operational parameters, which are not restricted from being used, to determine specific modulating, encoding, and/or converting for the information frame 250. Thereafter, the PHY 202 modulates, encodes, and/or converts the information frame 250 in accordance with the selected one or more of the PHY operational parameters to provide the information signal 252. Additionally, the PHY 202 demodulates, decodes, and/or converts an information signal 254, including the wireless networking traffic and/or the information related to the wireless networking traffic, over the transmission medium to provide an information frame 256 in the uplink direction 222. Alternatively, or in addition to, the information signal 254 can include information received from the network server to restrict the PHY 202 from using one or more of the one or more PHY operational parameters that are supported by the PHY 202.

The MAC 204 represents an interface between the PHY 202 and the processor 202. The MAC 204 manages and maintains communications of the WAP 200 by coordinating access to the transmission medium with the other WAPs and formats communications in accordance with one or more communication standards or protocols that are supported by the WAP 200. In the downlink direction 220, the MAC 204 encapsulates or frames a sequence of bits 258 to provide a payload portion of the information frame 250 and appends a preamble portion of the information frame 250 to the payload portion in accordance with the one or more communication standards or protocols, such as any of the communication standards or protocols as described above, to the provide the information frame 250. In an exemplary embodiment, the header portion includes a type field for describing the information frame 250 as a management frame and a sub-type field for describing a type the management frame, such as an authentication frame, an association request frame, an association response frame, a beacon frame, a deauthentication frame, a disassociation frame, a probe request frame, a probe response frame, a reassociation request frame, and/or reassociation response frame to provide some examples. In some situations, the MAC 204 can generate the payload portion of the information frame 250 from a previous sequence of bits 258 that is stored within the MAC 204. Otherwise, the MAC 204 decapsulates or de-frames the information frame 256 in accordance with the one or more communication standards or protocols to provide a payload portion of the information frame 256 as sequence of bits 260. The MAC 204 can, optionally, authenticate and/or authorize the information frame 256 before decapsulating or de-framing.

The processor 202 controls overall operation and/or configuration of the WAP 200. In an exemplary embodiment, the processor 202 determines whether the one or more PHY operational parameters are eligible to be restricted, determines the amount of congestion, and/or determines which PHY operational parameters from among the one or more PHY operational parameters are to be restricted as discussed above in FIG. 1A. In another exemplary embodiment, one or more of these operations, or portions thereof, can be performed by the network server in a similar manner as discussed above in FIG. 1B. Thereafter, the processor 202 can provide a restriction command 256 to restrict the PHY 202 from using one or more of the one or more PHY operational parameters that are supported by the PHY 202.

Exemplary Operation of the Processor within the Wireless Access Point (WAP)

FIG. 3 is a flowchart of exemplary operational steps of the processor for determining a restriction of one or more physical layer (PHY) operational parameters that are supported by a PHY according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 of a wireless access point (WAP) within a wireless network, such as one or more of the WAPs 104.1 through 104.*n* of the WN 100 or the WN 120 to provide some examples.

At step 302, the operational control flow 300 determines whether one or more physical layer (PHY) operational parameters, such as one or more PHY data rates to provide an example, from among multiple PHY operational parameters that are supported by the WAP are eligible to be restricted from being utilized for communicating a management signal, such as the management signal 150 to provide an example. This determination can be perform by the WAP and/or a network server, such as the network server 122 to provide an example, as described in FIG. 1A and FIG. 1B.

At step 304, the operational control flow 300 determines the amount of congestion the WN is experiencing to determine whether to restrict the one or more PHY operational parameters from being utilized for communicating the management signal. The operational control flow 300 determines the amount of congestion through monitoring the wireless networking traffic as described in FIG. 1A and FIG. 1B.

At step 306, the operational control flow 300 determines which PHY operational parameters from among the one or more PHY operational parameters are to be restricted from being utilized for communicating the management signal which can be advantageous in lessening congestion as described in FIG. 1A and FIG. 1B. Thereafter, the operational control flow 300 reverts to step 304 to determine the amount of congestion the WN is experiencing. As such, the restriction imposed by the operational control flow 300 represents an adaptive restriction that can be adapted by the operational control flow 300 in response to the amount of congestion the WN is experiencing. The WN can lessen the restriction allowing more PHY operational parameters from among the multiple PHY operational parameters to be utilized by the operational control flow 300 to communicate the management signal as the amount of congestion the WN is experiencing decreases and/or greaten the restriction allowing fewer PHY operational parameters from among the multiple PHY operational parameters to be utilized by the operational control flow 300 to communicate the management signal as the amount of congestion the WN is experiencing increases.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A wireless access point (WAP) within a wireless network, the WAP comprising:
   a physical layer (PHY) device configured to receive wireless networking traffic information from a plurality of communication devices; and
   a processor configured to:
      analyze a plurality of locations of the plurality of communication devices within the wireless network to determine an effective coverage area of the WAP,
      determine the WAP is servicing a small coverage area when the effective coverage area is less than a coverage area threshold,
      determine, in response to the WAP servicing the small coverage area, whether to restrict a first operational parameter from among a plurality of operational parameters from being utilized by the PHY device to communicate wireless network information based upon whether the wireless network is experiencing congestion, and determine, in response to the WAP not servicing the small coverage area, not to restrict the first operational parameter from being utilized by the PHY device to communicate the wireless network information regardless of whether the wireless network is experiencing the congestion.

2. The WAP of claim 1, wherein the wireless network information comprises a management signal that is periodically transmitted by the PHY device throughout the wireless network to establish wireless communication within the wireless network.

3. The WAP of claim 2, wherein the management signal comprises an authentication frame, an association request frame, an association response frame, a beacon frame, a deauthentication frame, a disassociation frame, a probe request frame, a probe response frame, a reassociation request frame, or a reassociation response frame.

4. The WAP of claim 1, wherein the processor is further configured to:
   determine the wireless network is experiencing the congestion; and
   determine, in response to the WAP servicing the small coverage area, to restrict the first operational parameter from being utilized by the PHY device to communicate the wireless network information when the wireless network is experiencing the congestion.

5. The WAP of claim 1, wherein the processor is further configured to:
   determine the wireless network is not experiencing the congestion; and
   determine, in response to the WAP servicing the small coverage area, to not restrict the first operational parameter from being utilized by the PHY device to communicate the wireless network information when the wireless network is not experiencing the congestion.

6. The WAP of claim 1, wherein the processor is configured to monitor wireless network traffic flowing through a geographical coverage area of the WAP to determine whether the wireless network is experiencing the congestion.

7. The WAP of claim 1, wherein the PHY device is further configured to:
   communicate the wireless network information in accordance with the first operational parameter in response to the first operational parameter not being restricted; and
   communicate the wireless network information in accordance with a second operational parameter from among the plurality of operational parameters in response to the first operational parameter being restricted.

8. A method for managing congestion in a wireless network, the method comprising:
   analyzing, by a wireless access point (WAP) within the wireless network, a plurality of locations of a plurality of communication devices within the wireless network to determine an effective coverage area of the WAP,
   determining, by the WAP, the WAP is servicing a large coverage area when the effective coverage area is greater than a coverage area threshold,
   determining, by the WAP and in response to the WAP not servicing the large coverage area, whether to restrict a first operational parameter from among a plurality of operational parameters from being utilized by the PHY device to communicate wireless network information based upon whether the wireless network is experiencing the congestion, and
   determining, by the WAP and in response to the WAP servicing the large coverage area, not to restrict the first operational parameter from being utilized by the PHY device to communicate the wireless network information regardless of whether the wireless network is experiencing the congestion.

9. The method of claim 8, wherein the wireless network information comprises a management signal that is periodically transmitted by the PHY device throughout the wireless network to establish wireless communication within the wireless network.

10. The method of claim 9, wherein the management signal comprises an authentication frame, an association request frame, an association response frame, a beacon frame, a deauthentication frame, a disassociation frame, a probe request frame, a probe response frame, a reassociation request frame, or a reassociation response frame.

11. The method of claim 8, further comprising:
    determining, by the WAP, the wireless network is experiencing the congestion; and
    determining, by the WAP and in response to the WAP not servicing the large coverage area, to restrict the first operational parameter from being utilized by the PHY device to communicate the wireless network information when the wireless network is experiencing the congestion.

12. The method of claim 8, further comprising:
    determining, by the WAP, the wireless network is not experiencing the congestion; and
    determining, by the WAP and in response to the WAP not servicing the large coverage area, to not restrict the first operational parameter from being utilized by the PHY device to communicate the wireless network information when the wireless network is not experiencing the congestion.

13. The method of claim 8, further comprising monitoring, by the WAP, wireless network traffic flowing through a geographical coverage area of the WAP to determine whether the wireless network is experiencing the congestion.

14. The method of claim 8, further comprising:
    communicating, by the WAP, the wireless network information in accordance with the first operational parameter in response to the first operational parameter not being restricted; and
    communicating, by the WAP, the wireless network information in accordance with a second operational parameter from among the plurality of operational parameters in response to the first operational parameter being restricted.

15. A wireless access point (WAP) within a wireless network, the WAP comprising:
    a physical layer (PHY) device configured to receive wireless networking traffic information from a plurality of communication devices; and
    a processor configured to:
      analyze a plurality of locations of the plurality of communication devices within the wireless network to determine an effective coverage area of the WAP,
      determine whether the WAP is servicing a small coverage area when the effective coverage area is less than a coverage area threshold or a large coverage area when the effective coverage area is greater than or equal to the coverage area threshold, determine, in response to the WAP servicing the small coverage area, whether to restrict a first operational parameter from among a plurality of operational parameters from being utilized by the PHY device to communicate wireless network information based upon whether the wireless network is experiencing congestion, and determine, in response to the WAP servicing the large coverage area, not to restrict the first operational parameter from being utilized by the PHY device to communicate the wireless network information regardless of whether the wireless network is experiencing the congestion.

16. The WAP of claim 15, wherein the wireless network information comprises a management signal that is periodically transmitted by the PHY device throughout the wireless network to establish wireless communication within the wireless network.

17. The WAP of claim 16, wherein the management signal comprises an authentication frame, an association request frame, an association response frame, a beacon frame, a deauthentication frame, a disassociation frame, a probe request frame, a probe response frame, a reassociation request frame, or a reassociation response frame.

18. The WAP of claim 15, wherein the processor is further configured to:
    determine the wireless network is experiencing the congestion; and
    determine, in response to the WAP servicing the small coverage area, to restrict the first operational parameter from being utilized by the PHY device to communicate the wireless network information when the wireless network is experiencing the congestion.

19. The WAP of claim 15, wherein the processor is further configured to:
    determine the wireless network is not experiencing the congestion; and
    determine, in response to the WAP servicing the small coverage area, to not restrict the first operational parameter from being utilized by the PHY device to communicate the wireless network information when the wireless network is not experiencing the congestion.

20. The WAP of claim 15, wherein the processor is configured to monitor wireless network traffic flowing through a geographical coverage area of the WAP to determine whether the wireless network is experiencing the congestion.

* * * * *